United States Patent [19]

Okano et al.

[11] 3,924,197

[45] Dec. 2, 1975

[54] CIRCUIT FOR REPRODUCING REFERENCE CARRIER WAVE

[75] Inventors: Akira Okano; Yoichi Moritani; Masahiro Murakami, all of Amagasaki, Japan

[73] Assignee: Mitsubishi Denki Kabushiki Kaisha, Tokyo, Japan

[22] Filed: Dec. 19, 1974

[21] Appl. No.: 534,343

Related U.S. Application Data

[62] Division of Ser. No. 427,099, Dec. 21, 1973, Pat. No. 3,886,462.

[30] Foreign Application Priority Data

Dec. 27, 1972 Japan .................................. 47-2506

[52] U.S. Cl. .................. 329/104; 178/88; 325/320; 331/12; 329/112; 329/122

[51] Int. Cl.² ...................... H04L 27/22; H03B 3/06

[58] Field of Search ...... 329/104, 112, 122; 331/12; 325/320; 178/88

[56] References Cited

UNITED STATES PATENTS

| | | | |
|---|---|---|---|
| 3,271,750 | 9/1966 | Padalino | 329/104 X |
| 3,336,534 | 8/1967 | Gluth | 331/12 |
| 3,358,240 | 12/1967 | McKay | 329/112 |
| 3,555,194 | 1/1971 | Goto | 331/12 |
| 3,654,564 | 4/1972 | Tisi et al. | 329/122 |
| 3,729,684 | 4/1973 | Shuda | 329/104 |

*Primary Examiner*—Alfred L. Brody
*Attorney, Agent, or Firm*—Wenderoth, Lind & Ponack

[57] ABSTRACT

A signal splitter splits a 2 differential phase shift keyed signal into four signal portions which, in turn, are subject to phase shifts of 0, $\pi$, $\pi/2$ and $3\pi/2$ radians, respectively. Those signal portions phase shifted by 0 and $\pi$ radians are applied to an OR circuit to be switched with a predetermined threshold voltage. The remaining signal portions are similarly processed by a NOR circuit. The outputs from both circuits are added to each other. The added signal is fed back to the signal splitter through a loop filter and a voltage controlled circuit to reproduce a reference carrier wave for the phase shift keyed signal.

4 Claims, 4 Drawing Figures

CIRCUIT FOR REPRODUCING REFERENCE CARRIER WAVE

This application is a Division of application Ser. No. 427,099 filed Dec. 21, 1973 now U.S. Pat. No. 3,886,462.

BACKGROUND OF THE INVENTION

This invention relates to a system for reproducing a carrier wave for a 2 differential phase shift keyed wave according to a composite detection technique, and more particularly to improvements in the phase composition system used with circuits for reproducing reference carrier waves.

In order to reproduce a reference carrier wave from a 2 differential phase shift keyed signal, the prior art processes have included a system for doubling an input frequency and then locking the phases, or a so-called inverse modulation system in which the input wave is again modulated on the basis of signal waves demodulated by a separate demodulator followed by the locking of the phase. Also, instead of the systems as above described, there has been proposed a composite detection system for reproducing a reference carrier wave for a 2 differential phase shift keyed signal while at the same time demodulating the phase shift keyed signal. In the composite detection system the use of a high modulation frequency might cause a threshold voltage with which a composition circuit performs the switching operation to be varied until the output from the composition circuit would disappear, resulting in a very narrow phase-locking area. Also, the frequency characteristic of the system might greatly deteriorate the sensitivity of detection of the required phase detectors.

SUMMARY OF THE INVENTION

Accordingly, it is an object of the present invention to provide a new and improved circuit for reproducing a reference carrier wave for a 2 differential phase shift keyed signal in which a range in which the phases can be locked increases by preventing a direct current level used for the switching from varying due to the frequency characteristic of the system.

The present invention accomplishes this object by the provision of a circuit for reproducing a reference carrier wave for a 2 differential phase shift keyed signal, comprising, in combination, a signal splitter circuit for splitting a 2 differential phase shift keyed signal applied thereto into four signal portions, phase shifter means for relatively shifting the phases of the four signal portions so that, with respect to a selected one of the signal portions, the remaining three signal portions have phase shifts of $\pi$, $\pi/2$ and $3\pi 12$ radians, respectively, one phase detector for phase detecting each of the relative phase shifted signal portions, a pair of logic circuits, each connected to one pair of the phase detectors procucing detected outputs having a phase difference of $\pi$ radians to switch the detected outputs with a predetermined threshold magnitude, and a composition circuit for adding the outputs from the pair of logic circuits to each other.

BRIEF DESCRIPTION OF THE DRAWINGS

The present invention will become more rapidly apparent from the following detailed description taken in conjunction with the accompanying drawings in which.

DESCRIPTION OF THE PREFERRED EMBODIMENTS

In the conventional type of composition systems, two detected waveforms are composed together. In the present invention, however, each pair of detected waveforms having a phase difference of $\pi$ radians is first composed and then the composed waveforms are composed together.

Figure 1:
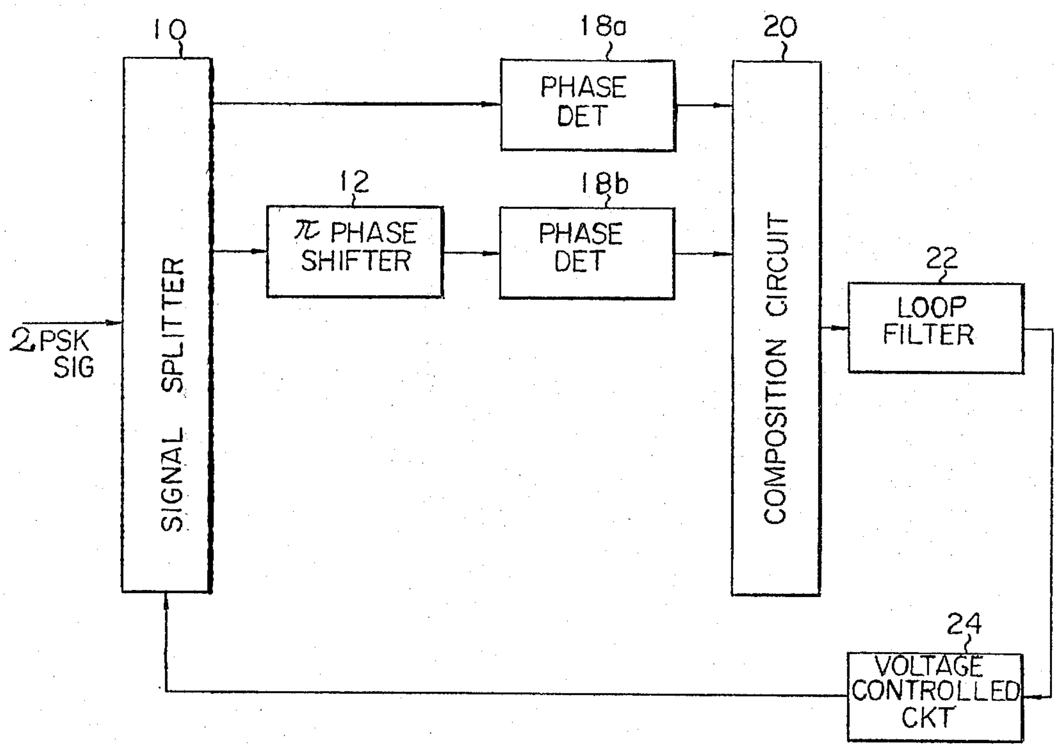
FIG. 1 PRIOR ART
FIG. 1 is a block diagram of a circuit for reproducing a reference carrier wave for a 2 differential phase shift keyed signal in accordance with the principles of the prior art.

Referring now to FIG. 1 of the drawings, there is illustrated a looped phase locking circuit for reproducing a reference carrier wave for a 2 differential phase shift keyed signal according to the conventional type of composite detection systems. The term "differential phase shift keyed" is abridged to a PSK. The arrangement illustrated comprises a signal splitter 10, a phase shifter 12, a first phase detector 18*a* connected directly to the signal splitter 10, a second phase detector 18*b* connected to the $\pi$ phase shifter 12.

All the phase detectors are connected to a composition circuit 20 which is, in turn, connected to a loop filter 22. Then the loop filter 22 is connected to the signal splitter 10 through a voltage controlled oscillator 24 which may be abridged to a "VCO" 24. Thus the arrangement forms a phase locking loop.

In order to reproduce a reference carrier wave by synchronizing the voltage controlled oscillator 24 with a 2 PSK modulated signal input to the phase locked loop, the two phase detectors 18*a*, 18*b*, have respective stable null points for the PSK modulated signals expressed by $$\{\sin\ (\omega_o + \Delta\omega)t + \pi\ K(t)\ \ K(t) = 0, 1,\}$$

the stable null point disposed at angular intervals of $\pi$ radians. This measure permits the voltage controlled oscillator 24 to respond to only a change in $\Delta\omega t$ but not to $\pi$ K($t$) to thereby reproduce a reference carrier wave expressed by $\sin\{(\omega_0 + \Delta\omega)t + \pi\ K(t)\}$. The details of the operation are well known in the art and need not be further described herein.

Figure 2:
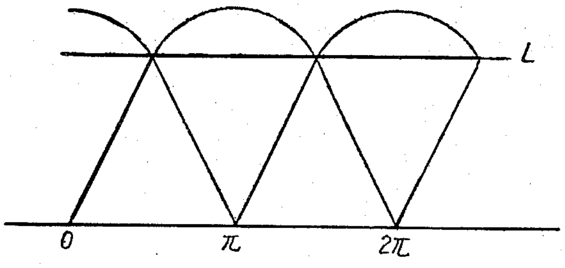
FIG. 2 PRIOR ART
FIG. 2 is a graph illustrating waveforms developed in the arrangement shown in FIG. 1.

The arrangement shown in FIG. 1 has been disadvantageous in that a phase locking area is very narrow. This is because the composition circuit 20 effects the switching with its threshold magnitude as shown by a horizontal dotted line in FIG. 2. Therefore if detected outputs from the phase detectors are attempted due to the frequency characteristic of the system for applications where the modulation frequency is high, then the direct current (dc) level is changed.

Figure 3:
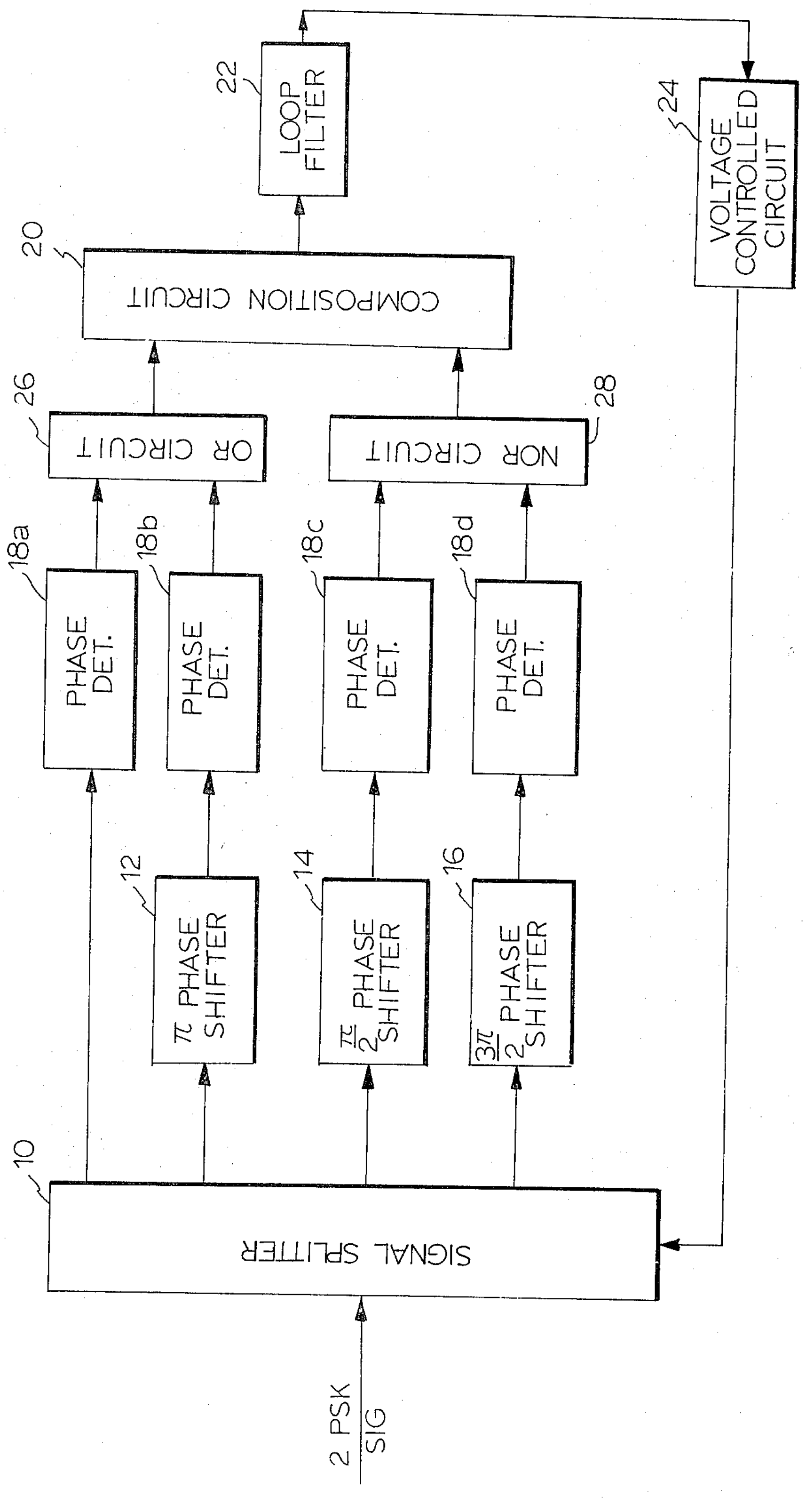
FIG. 3 is a block diagram of circuit for reproducing a reference carrier wave for a 2 differential phase shift keyed signal in accordance with the principles of the present invention.

Referring now to FIG. 3, it is seen that an arrangement disclosed herein is similar to that shown in FIG. 1 except that an OR circuit 26 is connected at two inputs to the phase detectors 18*a* and 18*b*, respectively, while a NOR circuit 28 is connected at two inputs to the phase detectors 18*c* and 18*d*, respectively, and that the OR and NOR circuits 26 and 28, respectively, are connected to the composition circuit 20. Also, the phase shifters 12, 14 and 16 are designed to shift the phase by angles of $\pi$, $\pi/2$ and $3\pi12$ radians, respectively.

Figure 4:
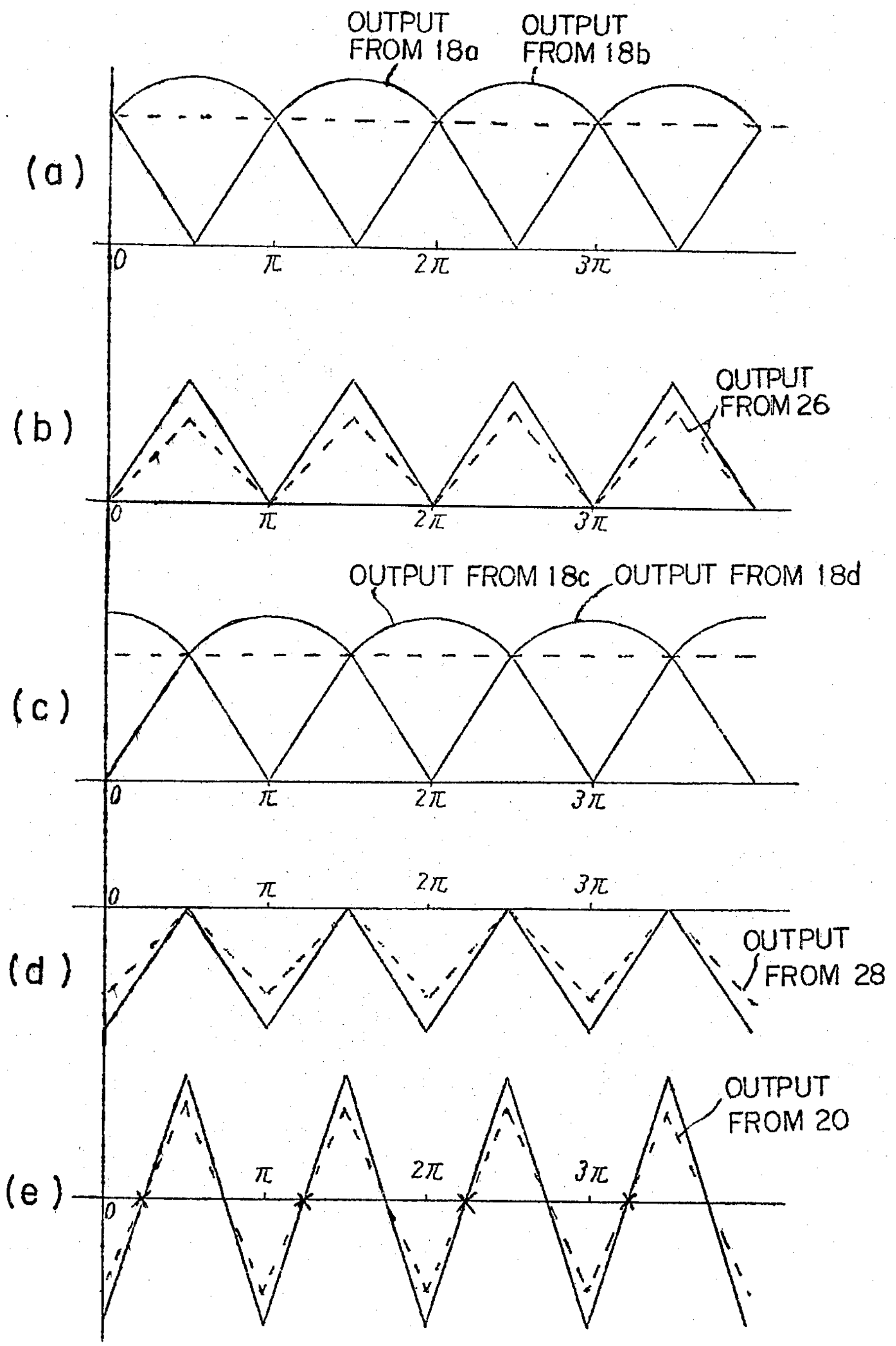
FIG. 4 is a graph illustrating waveforms developed at various points in the arrangement shown in FIG. 3; and Throughout the several Figures like reference numerals designate the identical or corresponding components.

The operation of the arrangement as shown will now be described with reference to FIG. 4.

A received 2 PSK signal is supplied to the signal splitter 10 where it is split into four signal portions. A first one of the split signal portions is directly applied to the first phase detector 18*a*, and a second split signal portion is applied to the second phase detector 18*b* through the $\pi$phase shifter 12. Both phase detectors 18*a* and 18*b* produce detected outputs as shown by waveforms in FIG. 4*a*. On the other hand, a third one of the split signal portions is applied to the third phase detector 18*c* through the $\pi/2$ phase shifter 14 and a fourth split signal portion is applied to the fourth phase detector 18*d* through the $3\pi/2$ phase shifter 16. The phase detectors 18*c* and 18*d* produce detected outputs as shown as waveforms in FIG. 4*c*. It will be appreciated that the detected outputs from the phase detectors 18*a* and 18*c* have phase differences of $\pi/2$ radians with respect to those from the phase detectors 18*b* and 18*d*, respectively.

The detected outputs from the phase detectors 18*a* and 18*b* are supplied to the OR circuit 26, while the detected outputs from the phase detectors 18*c* and 18*d* are supplied to the NOR circuit 28. The OR and NOR circuits 26 and 28, respectively, have respective switching levels or threshold magnitudes set adjacent the dc levels of the waveforms as shown at horizontal dotted lines in FIGS. 4*a* and 4*c*. Therefore, the logic circuits 26 and 28 produce outputs as shown in FIGS. 4*b* and 4*d*, respectively. Then the output from the OR circuit 26 and the NOR circuit 28 are added to each other by the composition circuit 20 to provide an output waveform as shown by a thick solid line in FIG. 4*e*. The output waveform from the composition circuit 20 has its synchronized stable point as shown at cross in FIG. 4*e*.

The output of the composition circuit 20 is fed back to the signal splitter 10 through a loop filter 22 and a voltage controlled oscillator 24, thereby to form a phase locked loop as in the arrangement of FIG. 1. Thus, a reference carrier wave $\sin\ (\omega_o + \Delta\omega)t + \pi K\ (t)$ is supplied to the signal splitter 10.

In the arrangement as shown in FIG. 3, it will be appreciated that, with the modulation frequency high, any attenuation of the detected waveforms due to the frequency characteristic causes the outputs from one of the OR circuits to change on one side, in this example the positive side as shown at the dotted line in FIG. 4*b*, while the output from the other NOR circuit is changed on the other or negative side as shown at the dotted line in FIG. 4*d*. Therefore, what is composed as shown at the dotted line in FIG. 4*e* remains always constant with the result that the dc level is scarcely varied.

From the foregoing, it will be apparent that the present invention provides a phase composition device having a stable lock area.

While the present invention has been illustrated and described in conjunction with a few preferred embodiments thereof, it is to be understood that numerous changes and modifications may be resorted to without departing from the spirit and scope of the present invention.

What is claimed is:

1. A circuit for reproducing a reference carrier wave for a 2-differential phase shift keyed signal, comprising, in combination, a signal splitter circuit for splitting a 2-differential phase shift keyed signal applied thereto into four signal portions, phase shifter means for relatively shifting phases of said four signal portions so that, with respect to a selected one of said signal portions, the remaining three signal portions have phase shifts of $\pi$, $\pi/2$, and $3\ \pi/2$ radians, respectively, one phase detector for phase detecting each of the relative phase shifted signal portions, a pair of logic circuits each connected to one pair of the phase detectors producing detected outputs having a phase difference of $\pi$ radians to switch said detected outputs with a predetermined threshold magnitude, a composition circuit for adding the outputs from said pair of logic circuits, a loop filter coupled to said composition circuit, and a voltage controlled oscillator coupled to said loop filter and to said signal splitter circuit to form a phase locked loop.

2. A circuit for reproducing a reference carrier wave as claimed in claim 1, wherein a selected one of said four split signal portions from said signal splitter circuit is directly supplied to one of said phase detectors while the remaining three split signal portions are supplied to the remaining phase detectors through those portions of said phase shifter means effecting phase shifts of $\pi$, $\pi/2$ and $3\ \pi/2$ radians, respectively.

3. A circuit for reproducing a reference carrier wave as claimed in claim 1 wherein one of said logic circuit is an OR circuit and the other logic circuit is a NOR circuit.

4. A circuit for reproducing a reference carrier wave as claimed in claim 1 wherein said pair of logic circuits are connected to said composition circuit.

* * * * *